May 5, 1953     H. MAGNUSKI     2,637,782
RESONANT CAVITY FILTER

Filed Nov. 28, 1947     2 SHEETS—SHEET 1

INVENTOR.
Henry Magnuski
BY
Foorman L. Mueller
Atty.

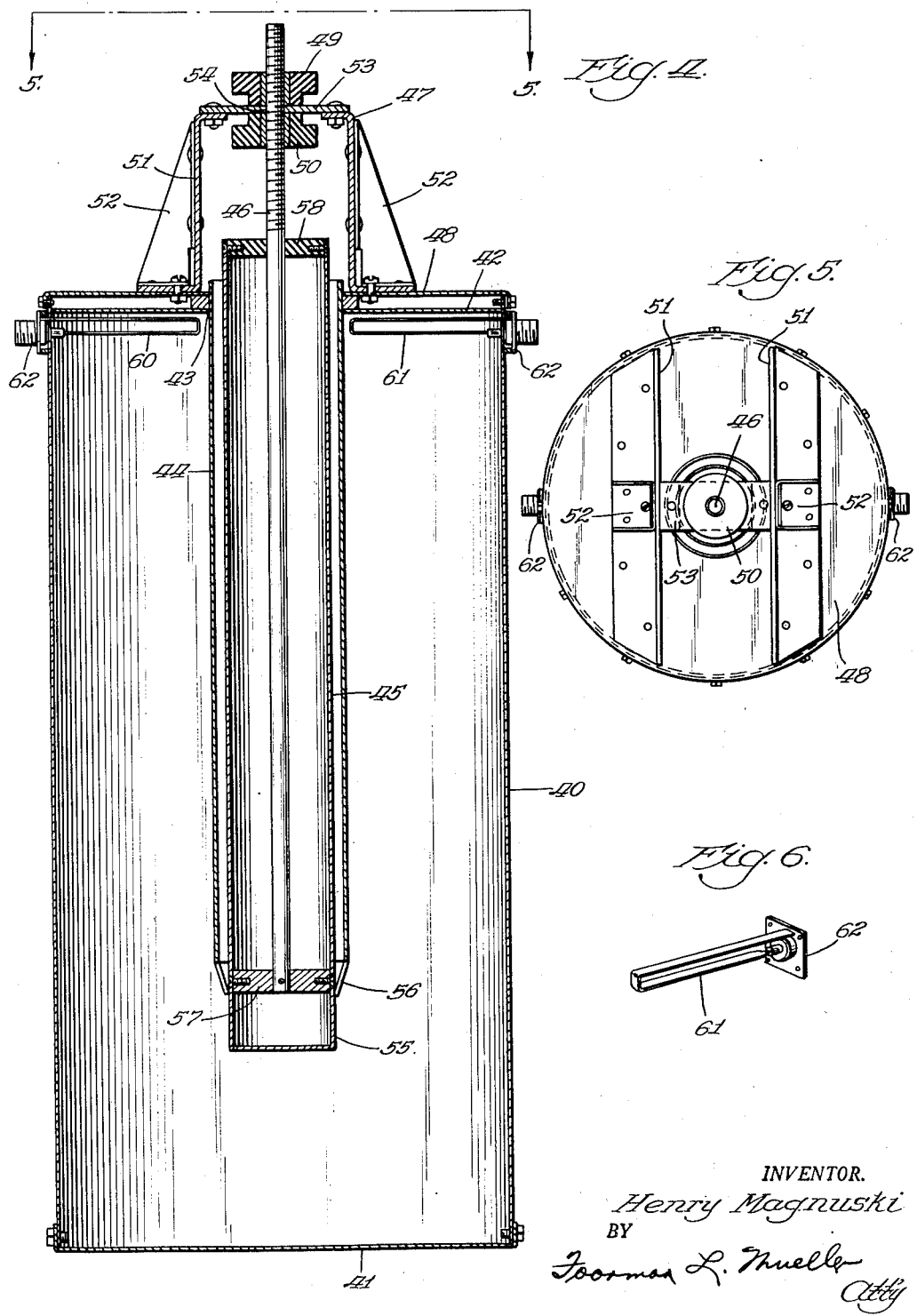

Patented May 5, 1953

2,637,782

UNITED STATES PATENT OFFICE 2,637,782

RESONANT CAVITY FILTER

Henry Magnuski, Chicago, Ill., assignor to Motorola, Inc., Chicago, Ill., a corporation of Illinois Application November 28, 1947, Serial No. 788,397

3 Claims. (Cl. 178—44)

This invention relates generally to filters and more particularly to resonant cavity filters adapted to permit the operation of a plurality of wave signal devices in the very high frequency range from a single antenna.

In the prior art various attempts have been made to work out filtering devices which prevent interaction between radio transmitters and receivers so that a plurality of units can be operated from a single antenna. This is particularly important in connection with very high frequency transmitters and receivers as the antennas required are relatively complicated and expensive. In installations where a plurality of transmitters and/or receivers are required, the provision of separate antennas for each unit both increases the cost and complicates the installation. It is desirable that such filters be adjustable so that they can be tuned to any frequency in the band of frequencies to be used by the transmitters and receivers with which they are associated. This permits filters of a standard construction to be used in all cases resulting in reduced cost as compared to a system in which each filter must be individually designed for a particular frequency. For filters to be effective to prevent interference between wave signal devices operating on closely adjacent channels with a single antenna, the filters must be capable of being very critically tuned. This requires that the filters must not change characteristics with changes in operating conditions such as changes in temperature.

It is therefore, an object of the present invention to provide an improved filter which is highly selective, which can be tuned through a range of frequencies and in which the frequency is not changed by varying operating conditions.

A further object of this invention is the provision of an efficient system including resonant cavity filters for connecting a plurality of wave signal devices to a single antenna in which the filters prevent interaction between the devices, attenuate spurious radiation from the transmitters, and decrease spurious responses in the receivers.

A feature of this invention is the provision of a coupling system including a plurality of wave signal devices operating on predetermined frequencies in a band of frequencies in the very high frequency range, with resonant cavity filters which are tuned to the frequency of the device with which they are associated coupling the devices to a common antenna.

A further feature of this invention is the provision of a highly selective resonant cavity filter including coupling means for connecting the filter to a coaxial line in such manner that relatively small insertion losses are produced thereby.

A still further feature of this invention is the provision of a resonant cavity filter having a movable conductor for tuning the same and a support for the movable conductor which automatically compensates for changes in temperature so that the frequency of the filter does not change with change in temperature.

Further objects, features and advantages will be apparent from a consideration of the following description taken in connection with the accompanying drawings in which:

Fig. 4 illustrates a structural configuration of a resonant cavity filter in accordance with the invention;

Fig. 5 is a top view of the filter of Fig. 4; and

Fig. 6 is a detail view of a coupling loop of the filter of Fig. 4.

In practicing the invention there is provided a system for connecting a plurality of wave signal devices to a single antenna without causing objectionable interaction between the devices. This is accomplished by connecting one or more resonant cavity filters, tuned to the frequency of each device, between each device and the antenna. Each filter comprises a cylindrical can including terminals connected to coupling loops to which the signal is applied and from which it is received. The filter is in effect a shorted resonant line and includes a center conductor having a movable portion which is effective to determine the resonant frequency of the cavity filter. Adjustable supporting means is provided for the movable portion of the center conductor so that the filter can be tuned to any frequency within a range of frequencies. The supporting means is composed of members the material of which is selected to have such temperature characteristics that the tuning of the filter will not be disturbed by changes in temperature.

Figure 1:
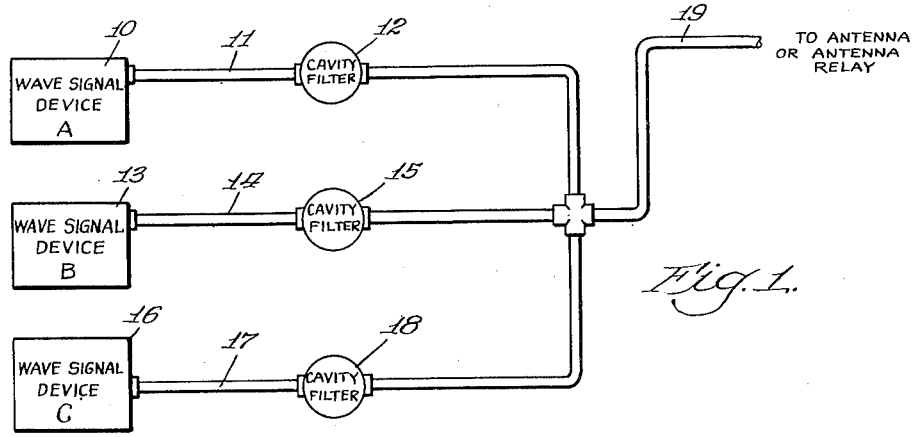
Fig. 1 illustrates a system for coupling three wave signal devices to a common antenna.
Figure 2:
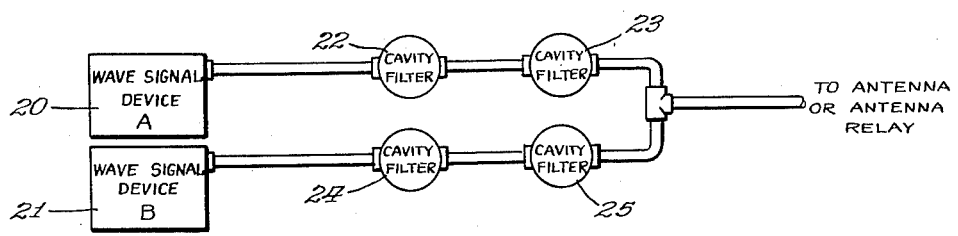
Fig. 2 illustrates a similar system using a plurality of filters in series.
Figure 3:
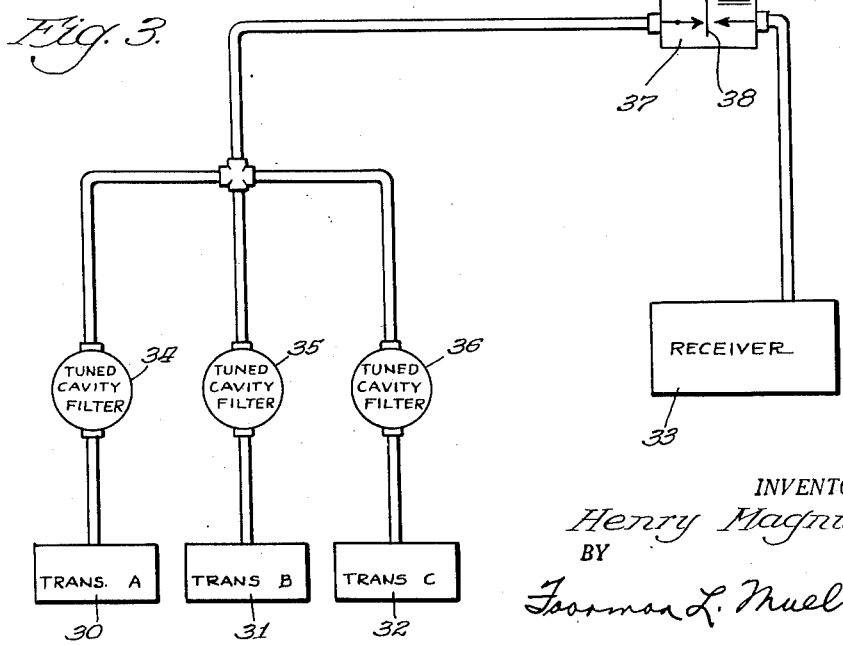
Fig. 3 illustrates a system in which a plurality of transmitters may be coupled through cavity filters to a relay which selectively connects the transmitters or a receiver to an antenna.

Referring now more particularly to the drawings, in Figs. 1 to 3, inclusive, there are illustrated three systems in which resonant cavity filters in accordance with the invention are used to permit connection of a plurality of wave signal devices to the same antenna. In Fig. 1 three wave signal devices, A, B and C are illustrated which may be three transmitters, three receivers, or any combination of transmitters and receivers. The wave signal device A indicated by reference character 10 is connected by coaxial cable 11 to resonant cavity filter 12, the wave signal device 13 is connected by coaxial cable 14 to resonant cavity filter 15, and the wave signal device 16 is connected by coaxial cable 17 to the filter 18. The resonant cavity filters 12, 15 and 18 are tuned to be resonant at the frequency of operation of the wave signal devices 10, 13 and 16, respectively, so that signals of the particular frequency to which the filters are tuned are passed thereby without substantial attenuation whereas other frequencies are greatly attenuated by the filters. It is obvious, therefore, that the filter 12 will provide a conducting path between the coaxial cable 19 connected to an antenna and the device 10 for signals of the frequency at which the device 10 is tuned to operate. The filters 15 and 18, however, will prevent signals of this frequency from reaching the devices 13 and 16 so that operation of the device 10 will have substantially no effect on these devices. Similarly, the filter 15 will pass signals of the frequency of the device 13, providing a conducting circuit between the device 13 and the antenna. These signals will be prevented from affecting the devices 10 and 16 by the filters 12 and 18 which will attenuate the signals of the frequency of the device 13. It is obvious that more than three devices may be operated with the same antenna by providing an equal number of filters.

The system in Fig. 2 is similar to the system in Fig. 1 except that the wave signal devices 20 and 21 are each connected to the antenna by two resonant cavity filters connected in series. Filters 22 and 23 are connected between the wave signal device 20 and the antenna, and filters 24 and 25 are connected between device 21 and the antenna. The filters will operate in the manner described in connection with Fig. 1 to provide a conducting path between the associated wave signal device and the antenna only for signals of the frequency to which each cavity filter is resonant. By using the filters in series added selectivity is obtained. It is obvious that a larger number of filters can be connected in series to obtain greater selectivity, the number being limited only by the losses in the filters as will be explained.

In Fig. 3 there is illustrated a system in which three transmitters 30, 31 and 32 and a receiver 33 are all adapted to be operated from a single antenna. The transmitters are connected through resonant cavity filters 34, 35 and 36 to relay 37 which is arranged to connect either the three transmitters or the receiver to the antenna. This is accomplished by movable contact 38 which is actuated by coil 39 which may be energized from a remote source to thereby provide remote control of the relay 37. The contact 38 is illustrated in the position in which the transmitters are connected to the antenna with the three transmitters being capable of simultaneous operation due to the isolating effects of the resonant cavity filters 34, 35 and 36. These filters function in the manner previously described in connection with Figs. 1 and 2 to provide a conducting path only for a particular frequency which in each instance will be the frequency of the transmitter to which it is connected. It is apparent that the contact 38 may be moved to the right so that the receiver 33 is connected to the antenna and the transmitters are disconnected.

Reference is now made to Figs. 4, 5 and 6 which illustrate the physical construction of the resonant cavity filter in accordance with the invention. In Fig. 4 the cavity is illustrated as including an outer conductor in the form of a cylindrical can 40 having a bottom closure 41 and a top closure 42 with a central opening 43 therein. Secured in the opening 43 is a tubular member 44 which extends concentrically into the can 40 a substantial portion of the distance to the bottom closure 41. Inside the tubular member 44 is a plunger 45 which combines with the tubular member 44 to provide a center conductor of adjustable length. The can 40 and center conductor thereby form a resonant line which is shorted at the top by closure 42. The plunger 45 is supported by an actuating rod 46 which is adjustably mounted on bracket structure 47. The bracket 47 is supported on an annular top closure 48 which is secured to the can 40 at its outer edge and having the inner diameter thereof positioned closely about the tubular member 44. A pair of nuts 49 and 50 threaded on rod 46 are positioned at either side of the bracket 47 to permit the rod 46 and accordingly the plunger 45 to be adjustably positioned with respect to the can 40. As is apparent from Figs. 4 and 5, the bracket 47 includes upstanding portions 51 which are secured to the top member 48. For making the portions 51 more rigid, bracing members 52 may be provided. A bridge member 53 connects the two upstanding portions 51 and includes an opening 54 which receives the rod 46.

As previously stated, the plunger 45 is movable within the tubular member 44 and includes a portion 55 which extends beyond the tubular member. The tubular member 44 includes a reduced end 56 which engages the plunger 45 in a sliding fit to support the plunger and make electrical contact thereto. In the very high frequency range, the cavity filter may be used as a quarter wave resonant line, and by changing the position of the plunger 45 by adjustment of the nuts 49 and 50, the length of the line can be changed so that the filter can be tuned to be resonant at any desired frequency within a predetermined range. For use in a system operating in the frequency range from 152 to 162 megacycles, the over-all size of the filter is slightly more than two feet.

The tubular member 44 and the plunger 45 of the center conductor also form a resonant line the length of which is substantially equal to a quarter wave length of the frequencies to which the filter is tuned. As these two members are spaced from each other at the top to form an open line, they will in effect be shorted at the bottom. Therefore, the filter will operate satisfactorily even though good electrical contact is not made between the end 56 of the member 44 and the plunger 45 due to the shorting effect of the open line.

Changes in length of the center conductor due to changes in temperature are accomplished by design of the actuating rod 46 and the bracket 47. The rod 46 is anchored to the plunger 45 by connection to the insulating spacer 57 which is in turn connected to the plunger 45. The spacer 58 at the top of the plunger has an opening of such size that the rod 46 can slide therein. By making the rod 46 and the bracket 47 of materials having different coefficients of expansion, and by properly dimensioning the rod and the bracket, it is possible to automatically compensate for changes in dimensions of the filter due to temperature changes to thereby hold the resonant frequency of the filter constant. In actual practice it has been found satisfactory to make the bracket of copper and the adjusting rod of nickel steel having a very small coefficient of expansion. By designing the components in the proportion illustrated in the drawing, automatic temperature compensation has been achieved.

The resonant cavity filter includes a pair of coupling loops 60 and 61 which form the input and output connections to the filter. The loops are positioned at the shorted end of the resonant line so that they will be positioned in the most intense field. As illustrated in Fig. 6, the loops are made of flat strips of metal which are doubled back to form a single U-shaped turn. By using flat strips having relatively large area, the capacity of the loop per unit length is increased. This is desirable so that the characteristic impedance of the loop will be approximately equal to that of the coaxial line to which it is connected, for the frequencies being used, as when this condition exists maximum selectivity is obtained. That is, the U-shaped turn is in effect a transmission line and, off resonance, tends to form a short circuit across the cable connected thereto. As the filter is perfectly symmetrical, it is immaterial as to which of the loops is used for input or output. Each of the loops is connected to a fitting 62 adapted to receive a coaxial cable, the fittings being arranged so that the loops 60 and 61 are connected between the center connector and the shield of the coaxial cable. The fittings 62 also connect the shields of the cable to the can 40 which may be at ground potential.

As previously stated, the filter is tuned by adjusting the position of the plunger 45 with respect to the can 40. The filter is particularly applicable for use in the very high frequency range as for example from 100 to 300 megacycles, but it is apparent that by properly dimensioning the components, the filter can be designed for use in other frequency ranges. Sufficient tuning range may be provided in the filter to correspond to the tuning range of standard transmitters and/or receivers. For example, filters have been constructed which are adjustable through the range from 152 to 162 megacycles. The filter has a very high Q so that for the frequency to which the filter is tuned the attenuation produced thereby will be very small. However, when frequencies other than the frequency to which the cavity is tuned are applied thereto, the cavity becomes substantially a short circuit, and by making the connections to the cavity an odd multiple of a quarter of a wave length the signals of other frequencies are substantially eliminated. The resonant cavity itself presents a high impedance when frequencies other than the frequency to which it is resonant are applied thereto. This results in small currents in the cavity and through the transformer action of the input coupling loop, the voltage across the loop is small to effectively form a short circuit.

For maximum selectivity, the loops must be relatively small. However, this results in minimum loading of the filter and the insertion loss of the filter, therefore, becomes a maximum. If it is not necessary to have such high selectivity, it is possible, by the use of large coupling loops having large surface area, to obtain smaller insertion loss at the sacrifice of high selectivity.

It is, therefore, seen that the characteristics of the coupling loops may be selected to fit a particular situation and permit the operation of the filter with small insertion loss when high selectivity is not necessary.

As stated above, the filters can be used to eliminate spurious responses in a receiver. The filter is particularly advantageous for this use as the selectivity is provided at the antenna end of the receiver so that undesirable frequencies are rejected before entering the receiver. As the filter would permit operation of a transmitter and receiver on the same antenna when they operate on different frequencies, it is obvious that the filter is also particularly advantageous for use in relay stations wherein signals are retransmitted on different frequencies. In such applications, it is highly desirable that the equipment be held to a minimum and the installation be as simple as possible. These requirements are met in the system disclosed.

The systems using the filter in accordance with the invention to operate a plurality of transmitters on the same antenna provide more practical systems than the use of separate antennas spaced from each other in many instances. For example, when it is desired to receive signals from one station when in the close vicinity of a second station, the second station may mask out the desired signals from the first station. This may happen even if the signals are of substantially equal strength. This difficulty is completely avoided when the two transmitters are positioned at the same location and use the same antenna as a receiver in any location will be at the same distance from both transmitters and normal selectivity will permit the reception of whichever signal is desired.

While there have been described certain embodiments of my invention which are illustrative thereof, it is apparent that various changes and modifications can be made therein without departing from the intended scope of the invention as defined in the appended claims.

I claim:

1. A resonant cavity filter tunable through a range of frequencies comprising a cylindrical can having closures on either end thereof, one of said closures having a circular opening in the center thereof, a tubular member extending in said can having a first end positioned in said opening in said one closure, and a second end spaced from said other closure, a plunger positioned in said tubular member and extending beyond said member at said second end thereof, an actuating rod secured to said plunger at one end thereof, and a bracket secured to said one closure for adjustably supporting said rod, said tubular member having a reduced portion at said second end engaging said plunger for making electrical contact thereto and for supporting said end of said plunger which extends beyond said member, said tubular member and said plunger being of such length to form a quarter-wave resonant line which is open at said first end of said tubular member and effectively forms a short circuit between said second end of said tubular member and said plunger at frequencies within said range, said rod and said bracket being made of materials having different temperature coefficients of expansion and being of such dimensions that the position of said plunger is automatically adjusted to hold the frequency of said filter substantially constant through variations in temperature.

2. A resonant cavity filter adapted to be inserted in a coaxial line for selecting signals of a particular frequency transmitted along said line, said filter including in combination, a cylindrical conducting can having conducting closures at the ends thereof, one of said closures having an opening in the center thereof, a central conductor structure extending in said can having a first portion secured in said opening in said one closure and a second end portion spaced from said other closure, and coupling means secured to said can on opposite sides thereof adjacent said one closure, said coupling means including an outer cylindrical conductor connected to said can and an inner conductor insulated from said can for connection to the conductors of the coaxial line, each of said coupling means including a U-shaped coupling loop connected between said outer and inner conductors and extending into said can toward said central conductor structure, said loops being made of flat conducting material with the flat arms thereof extending parallel to each other and being relatively closely spaced so that a relatively large capacity is provided thereby, said loops being constructed to have impedances substantially equal to that of said coaxial line within the range of frequencies of the filter.

3. A resonant cavity filter adapted to be inserted in a coaxial line and tunable through a range of frequencies for selecting signals of a particular frequency within said range transmitted along said line, said filter including in combination, a cylindrical conducting can having conducting closures at the ends thereof, one of said closures having an opening in the center thereof, a tubular member extending in said can having a first end secured in said opening in said one closure and a second end spaced from said other closure, a plunger positioned in said tubular member and having a portion extending beyond said second end thereof, said tubular member including an inturned portion at said second end for mechanically supporting said plunger and making electrical connection thereto, adjustable supporting means for said plunger secured to said one closure and movable to change the length of the portion of said plunger extending beyond said second end of said tubular member to thereby change the resonant frequency of said cavity filter, and coupling means secured to said can on opposite sides thereof adjacent said one closure, said coupling means including an outer cylindrical conductor electrically connected to said can and an inner conductor insulated from said can for connection to the conductors of the coaxial line, each of said coupling means including a U-shaped coupling loop connected between said outer and inner conductors thereof and extending into said can toward said tubular member, said loops being made of flat conducting material with the arms of the U extending parallel to each other and being relatively closely spaced so that a relatively large capacity is provided thereby, said loops being constructed to have impedances substantially equal to that of said coaxial line within the range of frequencies of said filter.

HENRY MAGNUSKI.

References Cited in the file of this patent

UNITED STATES PATENTS

| Number | Name | Date |
|---|---|---|
| 2,181,871 | Conklin | Dec. 5, 1939 |
| 2,190,131 | Alford | Feb. 13, 1940 |
| 2,226,479 | Pupp | Dec. 24, 1940 |
| 2,266,501 | Lindenblad | Dec. 16, 1941 |
| 2,402,443 | Peterson | June 18, 1946 |
| 2,423,548 | Bels | July 8, 1947 |
| 2,440,089 | Haeff | Apr. 20, 1948 |
| 2,454,042 | Dettinger | Nov. 16, 1948 |
| 2,503,256 | Ginzton et al. | Apr. 11, 1950 |
| 2,533,912 | Bels | Dec. 12, 1950 |